United States Patent [19]

Akai et al.

[11] Patent Number: 4,706,205
[45] Date of Patent: Nov. 10, 1987

[54] IMAGE PROCESSING APPARATUS WITH REDUCED HANDLING AND STORAGE

[75] Inventors: Takayuki Akai, Sagamihara; Junichi Yamaguchi, Ichikawa, both of Japan

[73] Assignee: International Business Machines Corporation, Armonk, N.Y.

[21] Appl. No.: 725,886

[22] Filed: Apr. 22, 1985

[30] Foreign Application Priority Data

Jun. 25, 1984 [JP] Japan .................................. 59-129430

[51] Int. Cl.⁴ ........................ G06F 15/62; G06F 12/06
[52] U.S. Cl. .................................... 364/518; 340/723; 340/727; 364/200; 364/521; 364/900; 382/44
[58] Field of Search .................................. 364/518–522, 364/200, 900; 340/723, 724, 727, 755; 382/44, 45, 46, 47

[56] References Cited

U.S. PATENT DOCUMENTS

| | | | |
|---|---|---|---|
| 4,267,573 | 5/1981 | Chaikin et al. | 364/518 |
| 4,384,338 | 5/1983 | Bennett | 364/522 |
| 4,490,797 | 12/1984 | Staggs et al. | 364/522 |
| 4,550,315 | 10/1985 | Bass et al. | 364/522 |
| 4,587,621 | 5/1986 | DuVall | 364/521 |
| 4,618,991 | 10/1986 | Tabata et al. | 340/727 |
| 4,635,212 | 1/1987 | Hatazawa | 364/518 |

*Primary Examiner*—Errol A. Krass
*Assistant Examiner*—Kevin J. Teska

[57] ABSTRACT

Digital information representing a displayable image is selectively modified to create various rotation effects, including rotations of the viewed image about various lines in its display plane and angular rotations within that plane. In the modification process, the information is moved between source and destination areas in a data processing system memory, without requiring intermediate buffer storage of the information during the process and therefore without requiring additional processing steps associated with intermediate buffer storage. The source and destination areas are of equal size and may overlap. This technique is applicable to document scanning apparatus as well as computer display apparatus.

4 Claims, 22 Drawing Figures

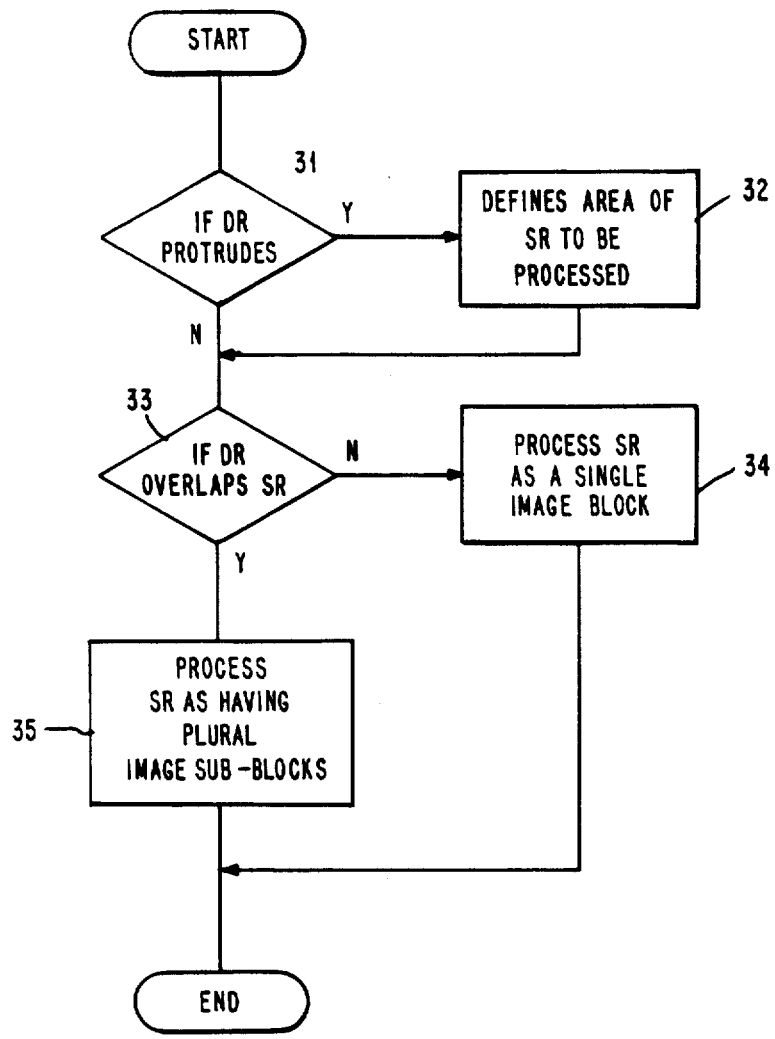

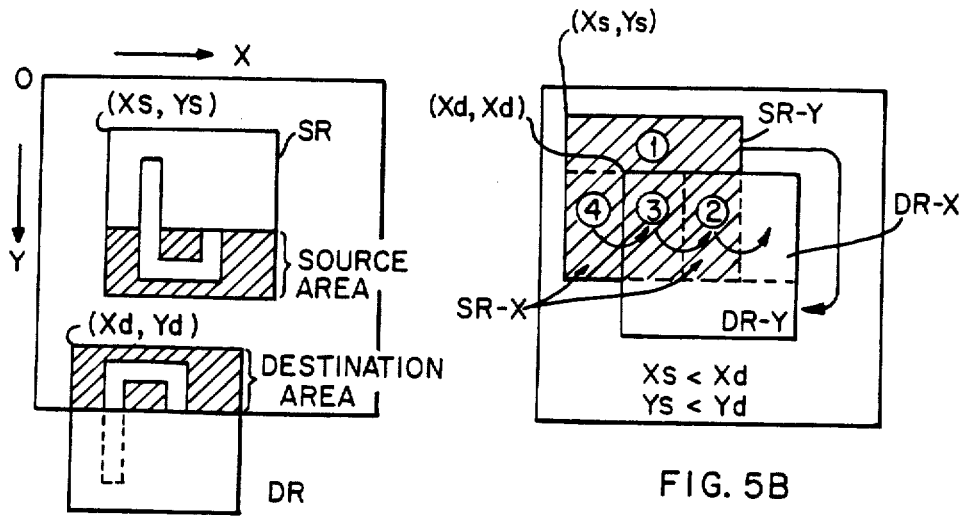
FIG. 5A
FIG. 5B
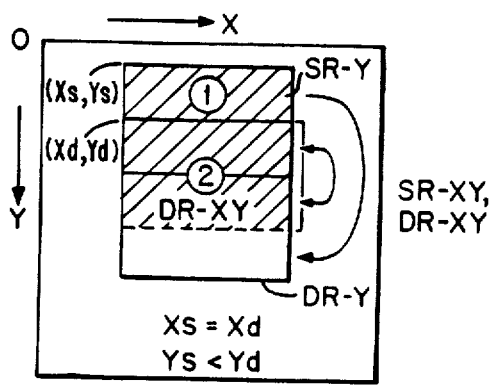
FIG. 5C
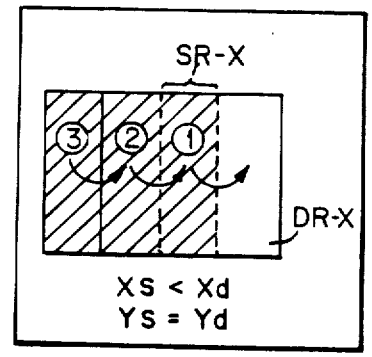
FIG. 5D

IMAGE PROCESSING APPARATUS WITH REDUCED HANDLING AND STORAGE

FIELD OF THE INVENTION

The invention relates to an image processing apparatus in which an image stored in a source area in an image memory area is processed and stored in a destination area in the image memory area.

In such apparatus, it has been required to perform various image processes, such as rotation, move, mirror, etc., on an image stored in an image memory, and to store the processed image into a destination area which overlaps on the original image.

PRIOR ART

Typically, prior technology for such processes has required an additional buffer memory which temporarily stores the original image fetched from the image memory. The original image in the buffer memory was processed, and the processed image was stored in the destination area in the image memory, as suggested in the Japanese Published Unexamined patent application No. 53-42524.

PROBLEM SOLVED BY THE INVENTION

As stated above, prior technology for designated processes required additional buffer memory, resulting in increased cost and additional image transfer steps between the image memory and additional buffer memory and between the buffer memory and processing unit.

An object presently is to provide such image processing functions without adding the cost and delays associated with intermediate buffer storage.

SUMMARY OF THE INVENTION

In accordance with this object, image processing apparatus of the present invention is characterized by means for specifying source and destination areas of substantially the same size in an image memory area.

means for determining whether these source and destination areas overlap, and for generating either a first response signal if they do overlap or a second response signal if they do not overlap, means responsive to said second response signal to process said image in said source area as a single image block, and means responsive to said first response signal to process said image in said source area by dividing said image into plural sub-image blocks and assigning predetermined priorities to said sub-image blocks.

DESCRIPTION OF THE DRAWINGS

FIG. 3 shows a flow chart of the operation of the image processing apparatus in accordance with the present invention.

FIGS. 5A, 5B, 5C and 5D show the partition and processing sequence of the source and destination areas in the Mirror-Horizontal function.

DESCRIPTION OF PREFERRED EMBODIMENTS

Figure 1:
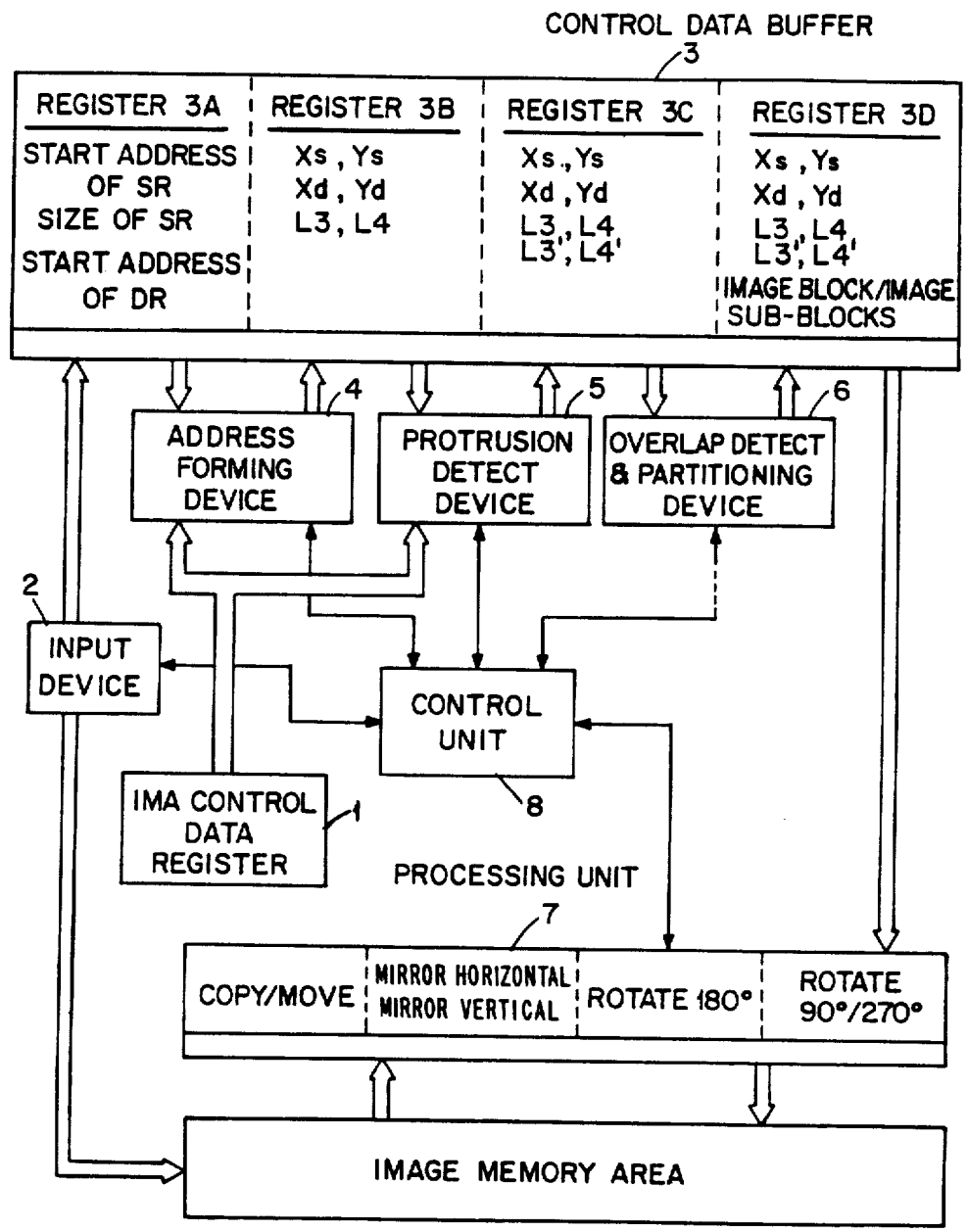
FIG. 1 shows a block diagram of an image processing apparatus in accordance with the present invention.

As stated hereinabove, the invention seeks to provide improved image handling processes—such as copy, move, mirror horizontal, mirror vertical 180 rotation, 90/270 rotation—between source and destination areas in an image memory area.

Referring to FIGS. 2A, 2B, 2C, 2D and 2E, image memory area (IMA) is formed in a raw image memory. The size of the IMA is selected in accordance with user requirements. The addresses of the storage position within the IMA are given as shown in the drawings. The user could specify an image of any size within the IMA as a source image. For convenience of description, it is assumed that the user specifies the source and destination images surrounded by rectangles, and these are called Source Rectangle (SR) and Destination Rectangle (DR).

FIGS. 2A, 2B, 2C, 2D and 2E show various combinations of source rectangles (SR) and destination rectangles (DR). In the subject processes, users fetch an image from SR, process the image and store the processed image into DR. A user may locate DR any place in the IMA if the coordinates of its upper-left corner, i.e. (Xd, Yd), are contained in IMA.

Figure 2A:
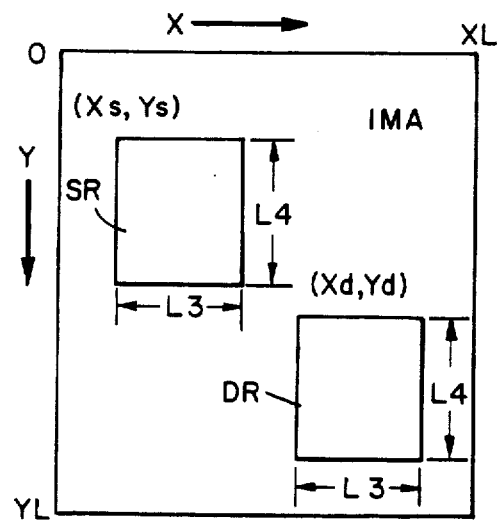
FIGS. 2A, 2B, 2C, 2D and 2E show various positional layouts of the source area and the destination area in the image memory area.
Figure 2B:
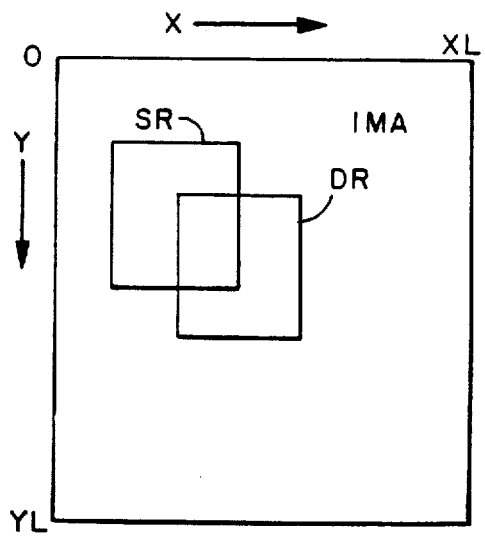
Figure 2C:
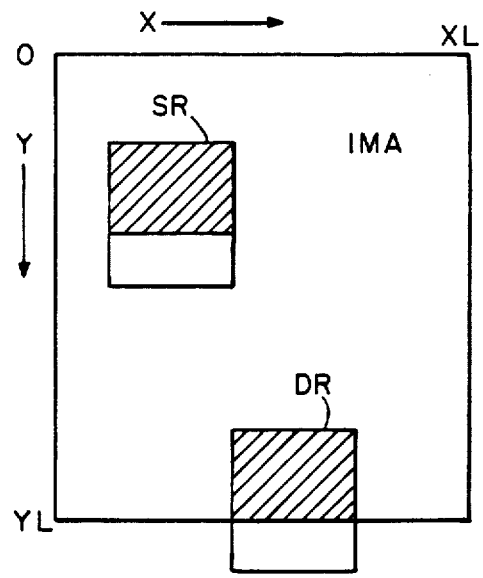
Figure 2D:
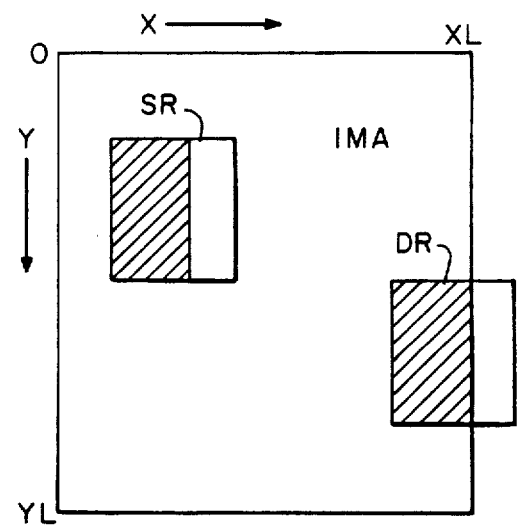
Figure 2E:
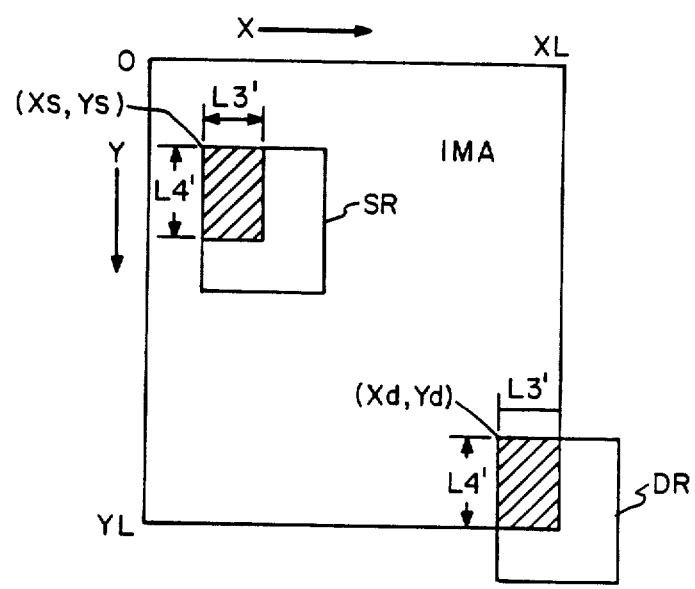

In the examples of FIGS. 2A and 2B, all image data in SR is fetched and processed, and the processed image data is stored in DR, the size of which is equal to the SR. In the examples of FIGS. 2C, 2D and 2E, only the shaded portion of DR is accessible to accept the processed image and therefore the fetch of source image data is required to be restricted to the corresponding shaded portion of SR. The contents of the shaded area portions are treated as the source and destination images in the succeeding image process.

Determination of the protrusion of DR outside of IMA and the definition of new source and destination areas is shown at 31 and 32 in the flow chart in FIG. 3. The next operation, at decision step 33, determines if the destination area overlaps the source area as shown in FIG. 2B. If they overlap, the overlapping part of the SR image must be saved before storage of image data into the DR to avoid destruction of the overlapping image data in SR.

If the overlap is not found at step 33, as shown in FIGS. 2C, 2D and 2E, the SR data is processed as a single block, as shown at 34. If overlap is found, operation 35 is selected in which the source area is divided into plural image sub-blocks, assigned different process priorities, and these sub-blocks are processed in the order of their priority. The methods of sub-block division and priority assignment depend on the process being performed, as later described.

Referring to FIG. 1, an IMA control data register 1 stores the upper left address of the IMA shown as address "0" in FIGS. 2A-2E, and the size of the IMA, i.e. coordinates XL and YL in the raw image memory. Plural image memory areas could be formed in the raw image memory, and IMA identifiers which represent the plural image memory areas, respectively, are stored in the data register 1. An input device 2 supplies the upper left address or start coordinates of the SR (Xs, Ys), the boundary coordinates L3 and L4 of that area, and the upper left start coordinates (Xd, Yd) of the DR. These factors are received and held in register 3A in a control data buffer 3. These parameters are supplied to an address forming device 4, which generates real addresses in the IMA for: the upper left corner of the SR, the boundary extends L3 and L4 of the SR, and the upper left corner of the DR. These addresses are transferred to a register 3B.

The data in register 3B is supplied to a protrusion detect device 5, which performs the decision operation 31 of FIG. 3, in the following manner:

The X dimension XL of the IMA is compared with Xd+L3, and the Y dimension YL of the IMA is compared with Yd+L4.

(a) If XL is larger than Xd+L3, the right edge of the DR is within the image memory area IMA.

(b) If XL is smaller than Xd+L3, the right edge of the DR protrudes beyond the right edge of the image memory area IMA, as shown in FIGS. 2D and 2E.

(c) If the magnitude of YL is greater than that of Yd+L4, the lower edge of the DR is within the image area IMA.

(d) If the magnitude of YL is less than that of Yd+L4, the lower edge of the DR protrudes below the lower edge of the area IMA, as shown in FIGS. 2C and 2E.

If the protrusion detect device 5 finds conditions (a) and (c), the "no" indication is given for decision 31. If the protrusion detect device 5 finds condition (b) and/or (d), the "yes" output is given at decision 31 which evokes operation 32.

The joint and several combinations of conditions (b) and (d) relate to the three "protruding" examples of FIGS. 2C, 2D and 2E. In these cases, device 5 determines the size, i.e. L3' and L4' of the non-protruding shaded area (FIG. 2E), based upon the values XL, YL, Xd, Yd L3 and L4, and specifies the shaded area of the same size and relative position in the SR. The shaded area of the SR is the source area from which the image is fetched, and the shaded area of the DR is the destination area into which the image is stored.

Referring again to FIG. 1, the start coordinates and size of the source area and the start coordinates of the destination area are stored in a register 3C.

Next, operation 33 (FIG. 3) performed by overlap detect and partitioning device 6 (FIG. 1), determines whether the source area, i.e. SR in the non-protruding examples of FIGS. 2A and 2B or the shaded sub-area of SR in the protruding examples of FIGS. 2C-2E, is overlapped by the destination area, i.e. DR is FIGS. 2A and 2B or the shaded part of DR in FIGS. 2C-2E. To determine overlap, device 6 compares: (1) the value of Xd—Xs with the length in the X direction of the source area, i.e. L3 or L3'; and (2) the value Yd—Ys with the length in the Y direction of the source area, i.e. L4 or L4'.

(e) If L3 (or L3')=Xd—Xs, a left or right side edge of the source area adjoins to a right or left side edge of the destination area.

(f) If L3 (or L3') is greater than Xd—Xs, the source area is overlapped by the destination area in the X direction.

(g) If L3 (or L3') is smaller than Xd—Xs, overlap does not occur in the X direction.

(h) If L4 (or L4')=Yd—Ys, an upper or lower edge of the source area adjoins to a lower or upper edge of the destination area.

(i) If L4 (or L4') is greater than Yd—Ys, the source area is overlapped by the destination area in the Y direction.

(j) If L4 (or L4') is less than Yd—Ys, overlap does not occur in the Y direction.

The conditions (f) and/or (i) indicate occurrence of overlap, and device 6 then partitions the source and destination areas into plural image sub-blocks, assigns priorities to the sub-blocks, and processes image portions in these sub-blocks in a manner controlled by one of Copy, Move, Mirror Horizontal, Mirror Vertical, 180 Rotate and 90/270 Rotation functions stored in a processing unit 7 (FIG. 1). Start addresses and the sizes of such image sub-blocks are stored in a register 3D (FIG. 1).

When decision 33 yields a "no" output, register 3D is supplied with the start address and sizes L3 (or L3') and L4 (or L4') of both source and destination areas, each of which is processed as a single image block.

Control unit 8 (FIG. 1) is connected to each of devices 2 and 4–6, and processing unit 7, to supply various control signals and clocks to the devices and unit.

Next, the detailed operation of each function performed by the processing unit 7 is described.

COPY/MOVE FUNCTION

Figure 4A:
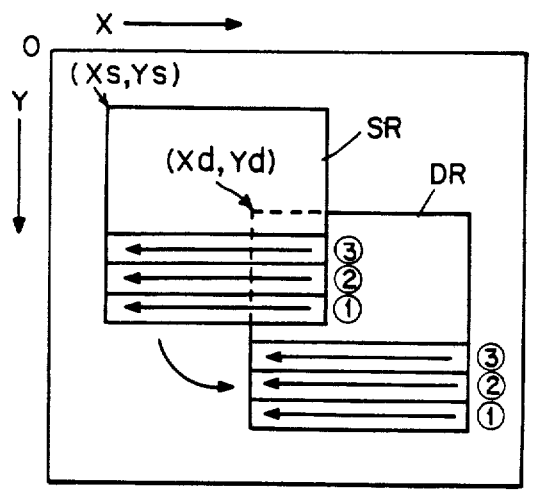
FIGS. 4A and 4B show the partition and processing sequence of the source and destination areas in the Copy/Move function.
Figure 4B:
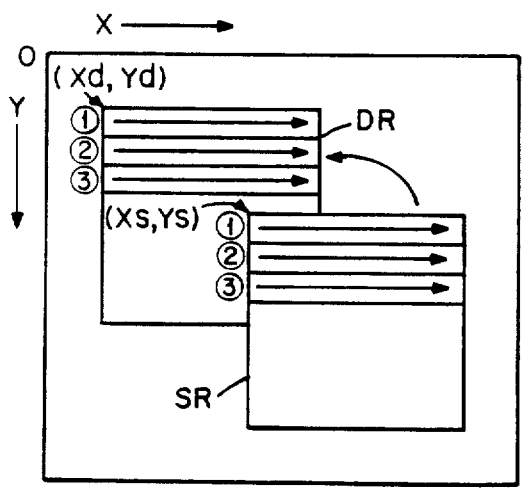

In both the Copy and Move functions, an image of the source area is simply moved to the destination area, as shown in FIGS. 2A-2E. The difference between the Copy and Move functions is that Move requires erasure of the image in the source area, while Copy does not erase the source image. If the source area is not overlapped by the destination area as shown in FIGS. 2A, 2C, 2D and 2E, the image of the source area is treated and processed as a single image block, as described with respect to blocks 33 and 34 in FIG. 3. If these areas overlap (FIG. 2B), the source and destination areas are partitioned into sub-blocks assigned priorities 1, 2,3 . . . , in accordance with the position of both areas, as shown in FIGS. 4A and 4B. The start address "As" of the source area is compared with the start address "Ad" of the destination area.

If the source start address "As" is higher than the destination start address "Ad", the images of the sub-blocks of the source area are moved in the bottom-up sequence, as indicated by numerals 1,2,3 . . . in FIG. 4A, and the image within each sub-block is fetched in the right-to-left sequence as indicated by an arrow in each sub-block.

If "As" is less than "Ad", the image of the source area is fetched and stored in the manner shown in FIG. 4B, in which sub-blocks in the source area are fetched in the top-down sequence indicated by numerals, 1,2,3 and stored in respective sub-blocks of the destination area. In this case, the image in each sub-block is fetched and processed in the left-to-right direction.

MIRROR-HORIZONTAL FUNCTION

FIGS. 5B, 5C and 5D exemplify various situations in which the destination and source areas overlap in either the X or Y directions or both directions. In these examples, the source areas are distinguished by shading. The Mirror-Horizontal functions for these examples involve the following partition determining and priority assigning steps. In association with these steps, pairs of corresponding sub-block partitions are defined in the source and destination areas, and Mirror-Horizontal processing is performed sequentially on the paired partitions in the order of assigned priorities (images in the source partitions are flipped about a horizontal axis and stored in the corresponding destination partitions in the sequence of assigned priorities [priority 1 before priority 2, priority 2 before priority 3, etc.]). The sequence of performance of the Mirror-Horizontal conversion and transfer functions is suggested by the curved arrows in FIGS. 5B, 5C and 5D. These functions may be performed either as each pair of sub-block partitions is defined or after all partitions have been defined.

Step (i)

It is determined if the destination area has a non-overlapping portion in the Y direction. If found (FIG. 5B or 5C), source and destination sub-block partitions SR-Y, DR-Y are defined as a corresponding pair, and assigned priority 1 for Mirror-Horizontal processing as defined above. In such processing, the image in SR-Y is rotated about a horizontal axis and stored in DR-Y. If a non-overlapping destination portion in the Y direction is not found, the process proceeds directly with the next step (ii).

Step (ii)

It is determined if the destination area has a non-overlapping portion in the X direction. If found (FIG. 5B or 5D), corresponding source and destination sub-blocks SR-X, DR-X are defined and assigned priority 1 or 2 (1 if no SR-Y, DR-Y partition has been defined; 2 otherwise), and processed for Mirror-Horizontal conversion in the order of assigned priority (the image in SR-X is flipped horizontally and stored in DR-X in the sequence suggested by the curved arrows in FIG. 5B or 5D). If an X pair of partitions is not found, the operation proceeds directly to the next step (iii).

Step (iii)

It is determined if the destination and source areas overlap in both the X and Y directions (FIG. 5B or 5C). If this is found, partition pairs will have been defined in preceding steps for any non-overlapping portions of these areas (SR-Y/DR-Y, SR-X/DR-X in the example of FIG. 5B; SR-Y/DR-Y in the example of FIG. 5C), and an additional partition SR-XY/DR-XY is defined in this step for the overlapping portions of these areas (see FIG. 5C). This X-Y partition is assigned lowest priority for processing (priority 2 in the example of FIG. 5C), and subsequently processed reversing the image in SR-XY horizontally and storing the resulting image in DR-XY.

MIRROR-VERTICAL FUNCTION

The Mirror-Vertical function fetches the image in the source area, forms a mirror image with respect to a vertical axis, and stores the latter in the destination area, as shown in FIGS. 6A, 6B, 6C and 6D. The function includes the following steps:

Step (i)

Figure 6A:
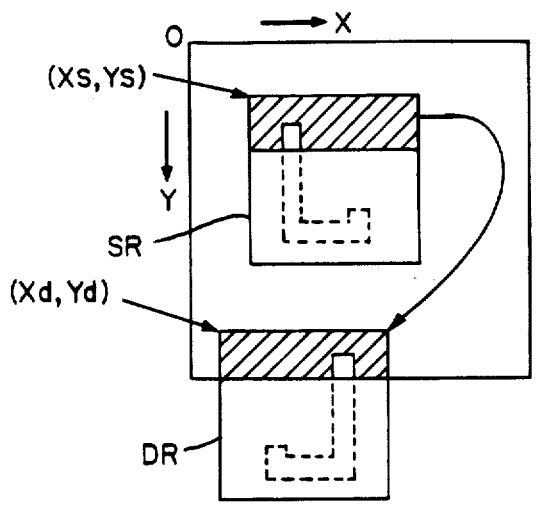
FIGS. 6A, 6B, 6C and 6D show the partition and processing sequence of the source and destination areas in the Mirror-Vertical function.
Figure 6B:
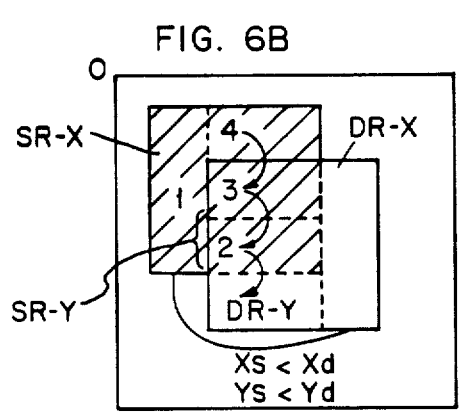

It is determined whether the destination area has a non-overlapping sub-block DR-X in the X direction. If found, the paired sub-block partition DR-X, SR-X is established and assigned process priority 1 (FIG. 6B). If not found, the process proceeds directly to the next step.

Step (ii)

Figure 6C:
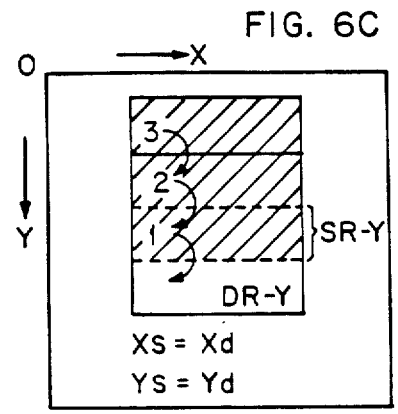
Figure 6D:
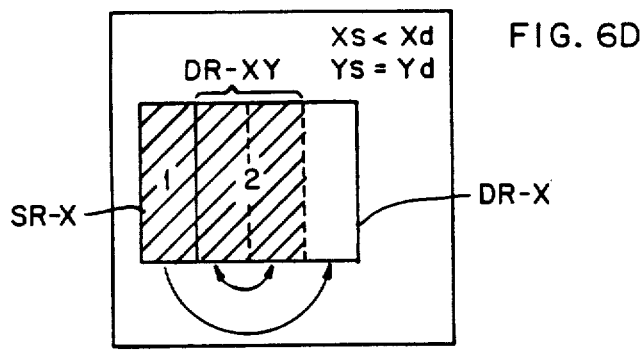

It is determined whether the destination area has a non-overlapping sub-block DR-Y in the Y direction. If found, paired sub-block partition DR-Y, SR-Y is defined, and assigned priority 1 or 2 (FIG. 6B or 6C). The remaining area is divided into plural sub-blocks, each of which has the same size. If not found, the process proceeds to the next step.

Step (iii)

It is determined whether the destination area overlaps the source area. If found, the partition pair SR-XY, DR-XY is defined and treated as suggested in FIG. 6D.

180 ROTATION FUNCTION

Figure 7A:
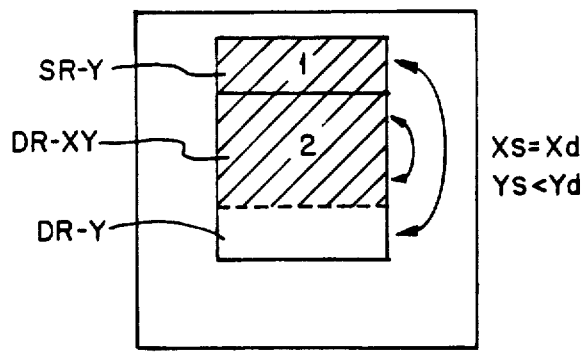
FIGS. 7A, 7B and 7C show the partition and processing sequence of the source and destination areas in the 180 Rotation function.
Figure 7B:
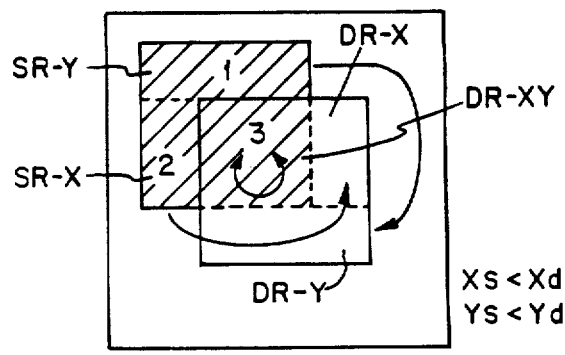
Figure 7C:
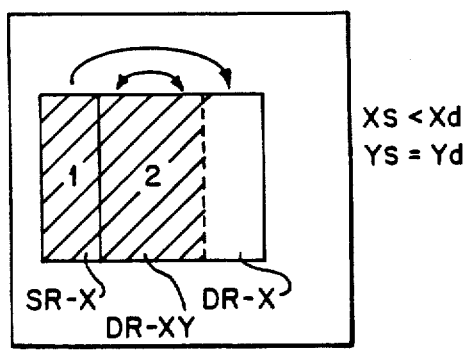

The image of the source area is rotated 180 degrees and stored in the destination area. FIGS. 7A, 7B and 7C suggest the process. The source and destination areas are partitioned into non-overlapping and overlapping paired sub-blocks as in the previously described functions. Images in the source sub-blocks are subjected to Mirror-Horizontal followed by Mirror-Vertical processing, and transferred to respective destination sub-blocks. The intermediate images after Mirror-Horizontal handling may also be stored in the respective destination sub-blocks.

90/270 ROTATION FUNCTION

Figure 8A:
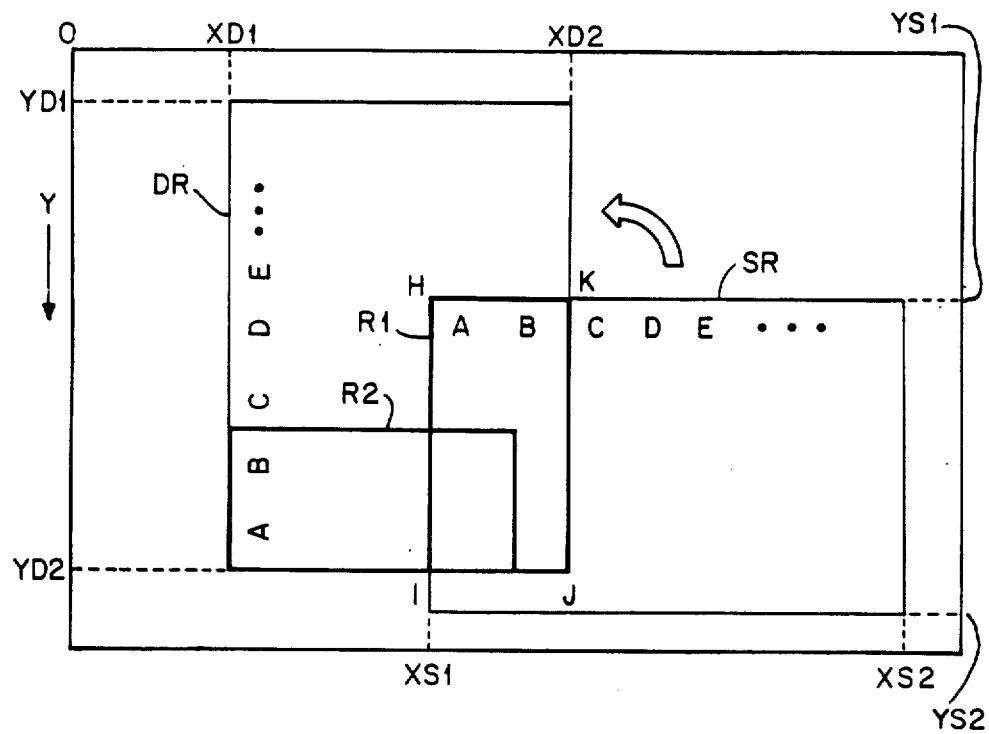
FIGS. 8A and 8B show the partition and processing sequence of the source and destination areas in the 90/270 Rotation function.
Figure 8B:
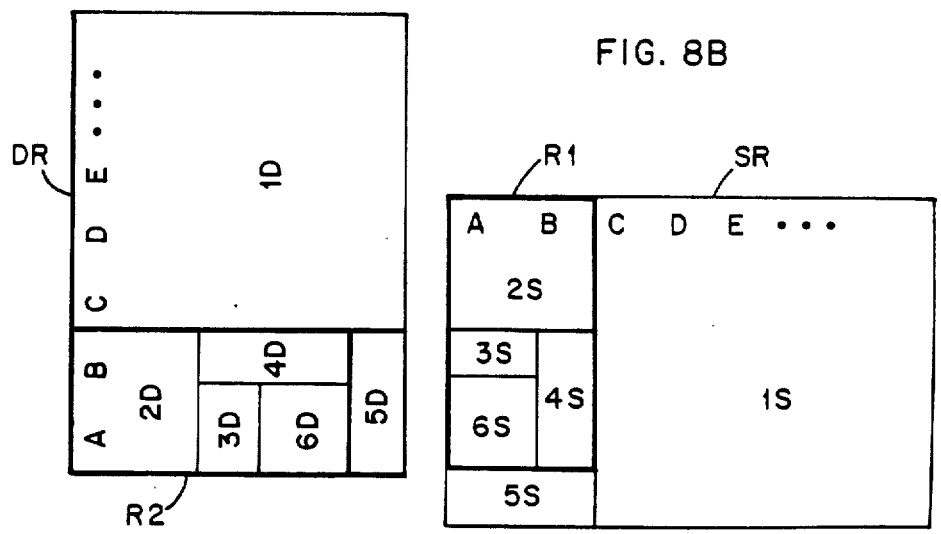

An image of the source area is rotatively moved to the destination area with 90 or 270 degree rotation. FIG. 8A indicates in heavy outline sub-area R1 in the source area, which overlaps the destination area and is required to map into heavily outlined corresponding sub-area R2 in the destination area upon completion of the rotation function. The partitioning treatment of these sub-areas is suggested in FIG. 8B. The source area is defined by the values of XS1, XS2, YS1 and YS2 indicated in FIG. 8A. The destination area is defined by the values of XD1, XD2, YD1, and YD2 also indicated in FIG. 8A. Sub-area R1 is defined by its end-points H, I, J, K determined by the following algorithms.

POINT H (XS1, YS1)

The values XD1 and XS1 are compared, and if not equal, the larger value, i.e. XS1, is selected. The values YD1 and YS1 are compared, and if not equal, the larger value, i.e. YS1, is selected.

POINT I (XS1, YD2)

The value XS1 of point H is used. The values of YD2 and YS2 are compared, and if not equal, the smaller value, i.e. YD2, is selected.

POINT J (XD2, YD2)

The value YD2 of point I is used. The values of XD2 and XS2 are compared, and if not equal, the smaller value, i.e. XD2, is selected.

POINT K (XD2, YS1)

The values XD2 of point J and YS1 of point H are used.

Sub-area R1 of SR is rotatively moved to sub-area R2 of DR. The position of R2 is calculated based upon coordinate points. Both SR and DR in FIG. 8A are shown separately in FIG. 8B, for clarity.

The basic concept of the algorithm includes steps of determining a common or overlapping area in R1 and R2; and partitioning that area into one square area and a remaining area. In the exemplary embodiment, the common area is divided to a square area 6S/6D and remaining area 3S. It is noted that the source image in area 3S should be processed and saved first to prevent its destruction, and the source image in the square area 6S need only be rotated within this area 6S. Therefore, higher priority for processing is given to the image in area 3S.

The source area is partitioned into sub-blocks 1S through 6S, and the destination area into respective corresponding sub-blocks 1D through 6D as follows. Note that 2S, 3S, 4S, and 6S are contained in R1 and 2D, 3D, 4D, and 6D are contained in R2.

| Source | Destination |
|---|---|
| Sub-block 1S | Sub-block 1D |
| Sub-block 2S | Sub-block 2D |
| Sub-block 3S | Sub-block 3D |
| Sub-block 4S | Sub-block 4D |
| Sub-block 5S | Sub-block 5D |
| Sub-block 6S | Sub-block 6D |

To avoid destruction of source image data, the algorithm finds sub-block which should be moved or processed earlier, and assigns the following priorities to each sub-block.

Sub-blocks included in R1 have higher priority that the rest of SR (i.e. 2S, 3S, 4S and 6S have higher priority than 1S and 5S).

Sub-block 3S has higher priority than 4S.

Sub-block 6S can be processed at any time.

As stated above, square sub-block 6S overlaps on 6D, hence the image of the sub-block 6S could be rotated within this sub-block at any time.

In accordance with the invention, the foregoing image processing with reduced processing time is realized without requiring any additional hardware.

What is claimed is:

1. A method of processing digital image information to create various translation and rotation effects in images represented by said information comprising:

establishing equal-sized and possibly overlapping source and destination areas in a processing system memory and storing the image information to be processed in said source area; and using only said source and destination areas of said memory and the logical capabilities of said processing system, selectively processing said information stored in said source area to selectively create said effects and directly storing information resulting from said processing in said destination area.

2. The method of claim 1 wherein said information processing and storing steps comprise:

determining if said source and destination areas overlap;

if said areas do not overlap, processing the information in said source area as a single integral unit and storing the resulting image information in said destination area;

if said areas do overlap partitioning said source and destination areas into plural pairs of equal-sized source and destination area sub-blocks; and assigning predetermined priorities to said paired area sub-blocks for processing; and processing the information in source area sub-blocks in the sequence of said assigned priorities, and storing information resulting from said processing in respectively paired destination area sub-blocks in said priority sequence.

3. The method of claim 2 wherein said processing and storing steps further comprise:

selectively modifying the image information in either said single integral block or individual said sub-blocks to effect selected rotations of respective images about a central point and one or more centrally situated lines within the planes of respective images; and storing the resulting information, representing variously rotated views of the source image, into the destination area in either a single operation or a plurality of sub-operations associated respectively with said single integral block or said sub-blocks.

4. A method of transferring digital image information between equal-sized and possibly overlapping source and destination storage areas in a processing system memory and for selectively modifying the information so transferred without using additional areas of said memory for buffer storage during the modification process, comprising:

determining if the source and destination areas overlap;

if said areas do not overlap, processing the information in said source area as a single block to effect said modification and transferring the resulting processed information to said destination area as a single block without using additional memory for buffer storage of said processed information; and if said areas do overlap, partitioning the source and destination areas into plural pairs of associated source and destination sub-blocks; and (a) assigning predetermined priorities to said paired sub-blocks for modification processing; and (b) processing the information in said source area sub-blocks in the sequence of said assigned priorities, to effect said selective modification piecemeal, and storing resulting image information in respective destination area sub-blocks in said processing sequence without using any additional memory for buffer storage of said resulting information.

* * * * *